United States Patent [19]
Thompson, Jr.

[11] 3,754,149
[45] Aug. 21, 1973

[54] OPTICAL DETECTOR FOR DETECTING RECTIFIER TUBE FAILURES AND RF ELECTRICAL DISCHARGES

[75] Inventor: Chester C. Thompson, Jr., Roslyn Heights, N.Y.

[73] Assignee: Radiation Dynamics, Inc., Westbury, L.I., N.Y.

[22] Filed: June 19, 1972

[21] Appl. No.: 263,773

[52] U.S. Cl............. 307/117, 317/60, 317/9 R, 250/226, 324/96, 324/51, 340/213 R
[51] Int. Cl. .............................. H01h 35/00
[58] Field of Search.................. 317/60, 9 R; 307/116, 117; 250/226, 83.3 LN; 324/96, 121, 51; 340/213 R, 253 E

[56] References Cited
UNITED STATES PATENTS
3,356,908 12/1967 Mitchell et al................. 307/117 X
3,467,858 9/1969 Burnett.......................... 324/96

Primary Examiner—Herman J. Hohauser
Attorney—Howard L. Rose et al.

[57] ABSTRACT

An optical detector in a high voltage system senses the blue glow discharge characteristic of insipient failure in rectifier tubes and removes system power. In a preferred embodiment the rectifier tubes are part of a voltage multiplier in a charged particle accelerator and an RF transformer is part of the high voltage supply. Another optical detector is employed to remove power from the accelerator upon sensing blue light in an arc discharge at the RF transformer coil.

14 Claims, 5 Drawing Figures

Patented Aug. 21, 1973 3,754,149

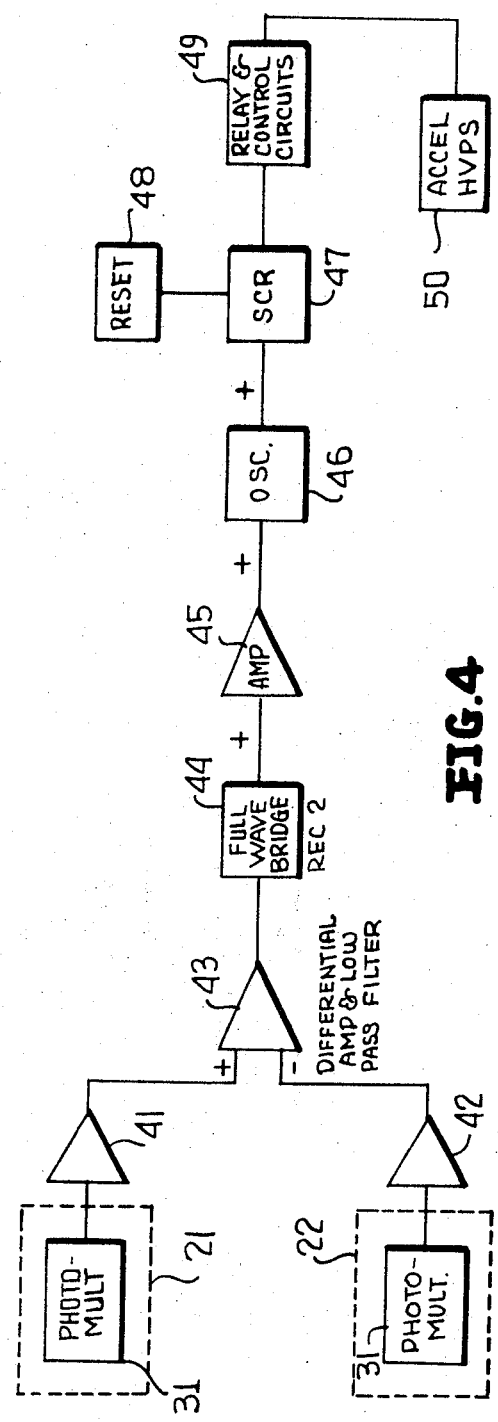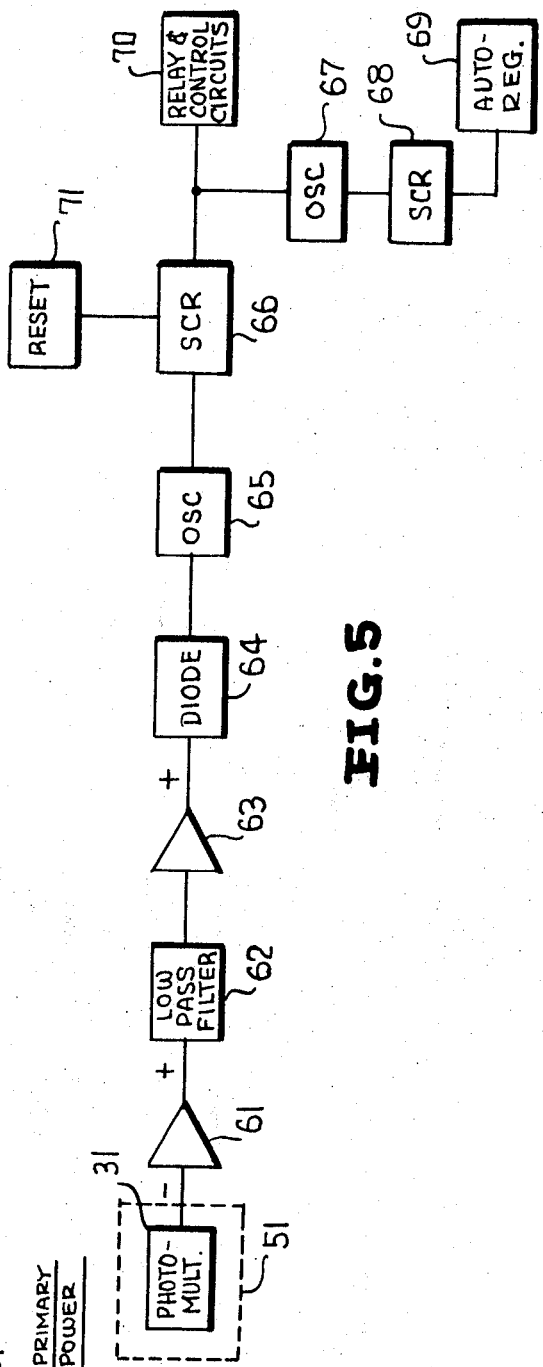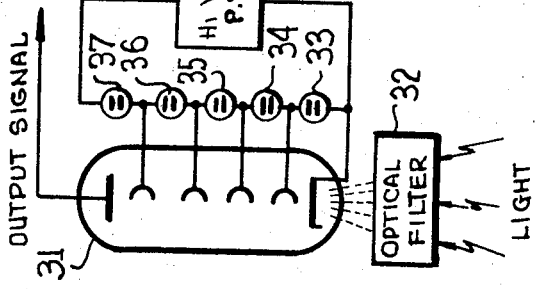

3,754,149

OPTICAL DETECTOR FOR DETECTING RECTIFIER TUBE FAILURES AND RF ELECTRICAL DISCHARGES

BACKGROUND OF THE INVENTION

The present invention relates to protective devices for high voltage systems and more particularly relates to an optical monitor for protecting particle accelerator tubes from destructive damage which can occur when a failure mode is initiated inside the tube. The protective arrangement of the present invention is described herein as it relates to the protection of a Dynamitron particle accelerator of the type manufactured by Radiation Dynamics, Inc., Westbury, New York; it is to be understood however that the present invention has utility in other types of particle accelerators and in high voltage equipment in general.

In the Dynamitron, as in any high voltage equipment, the primary cause for component damage is an electrical discharge or spark. If permitted to persist, the spark acts to progressively damage more and more components within the system. In the case of the Dynamitron the RF transformer coil in the high voltage supply circuit is the most susceptible component to this type of problem. Specifically, if continuous electrical discharge of the protective spark gaps is permitted to occur, the spark gap metal is eroded by the RF power causing molten metal to drop into the winding of the transformer. The resulting damage can only be repaired by completely rewinding the transformer.

It is therefore the one object of the present invention to provide a reliable detector for sensing arcing in the region of the RF transformer coil and for extinguishing the arcs before serious damage to the transformer occurs.

The Dynamitron includes rectifier tubes in its voltage multiplication circuit. These rectifier tubes may fail for several reasons, all of which result in the loss of tube emission. When this occurs the rectifier becomes a lossy device and eventually assumes a blue glow discharge mode. This discharge, if allowed to continue, destroys the glass envelope of the rectifier tube. When this occurs the insulating gas inside the accelerator vessel becomes active in the discharge. The insulating gas is decomposed and then combines with the metal components inside the tube to form a blue compound. This compound is transported around the inside of the vessel by the convective gas flow and is liberally deposited on the surfaces of critical accelerator components. This necessitates complete disassembly of the accelerator for cleaning before it may be put back into operation.

It is therefore another object of the present invention to provide a detector for sensing the blue glow discharge in a rectifier tube and removing power from the tube before serious system damage can occur.

It is another object of the present invention to provide an arc detector capable of sensing either electrical discharges or insipient rectifier tube failure in a charged particle accelerator.

SUMMARY OF THE INVENTION

In accordance with the principles of the present invention an optical arc detector is provided for sensing blue light characteristically found in both high voltage electrical discharges and rectifier tube glow discharge. In the Dynamitron a detector is mounted on each side of the rectifier stack and is positioned so that it may view all tubes on that side of the stack. In order that the detectors are not saturated by the copious amounts of light emitted by each rectifier tube in the lower part of the visible light spectrum, an optical filter is required which permits only blue light to be sensed by the detectors. Each detector includes a photo-multiplier tube and provides an out-put signal whose amplitude varies with the intensity of blue light sensed by the detector. The output signals from each detector are amplified and applied to opposite input terminals of a differential amplifier. The output signal from the differential amplifier is adjusted to reside at zero level when all rectifier tubes are energized normally. The occurrence of a rectifier tube failure is accompanied by a high level of blue light which is sensed by one or the other of the detectors. This provides an output signal from a differential amplifier which is utilized to remove power from the accelerator. The detector, when employed to monitor electrical discharge, may be positioned either inside or outside the accelerator vessel but must be oriented so that it receives either directly or indirectly the light generated by an arc. In this case the arc detector output signal is amplified and utilized to remove power from the accelerator.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 3 is a schematic diagram of the optical detector of the present invention;

FIG. 4 is a schematic diagram of the circuit for processing the output signals from a pair of optical detectors utilized to monitor the rectifier tube stack in the accelerator; and FIG. 5 is a schematic diagram of an optical detector employed to monitor electrical discharges in the accelerator of FIG. 1.

DESCRIPTION OF PREFERRED EMBODIMENT

Figure 1:
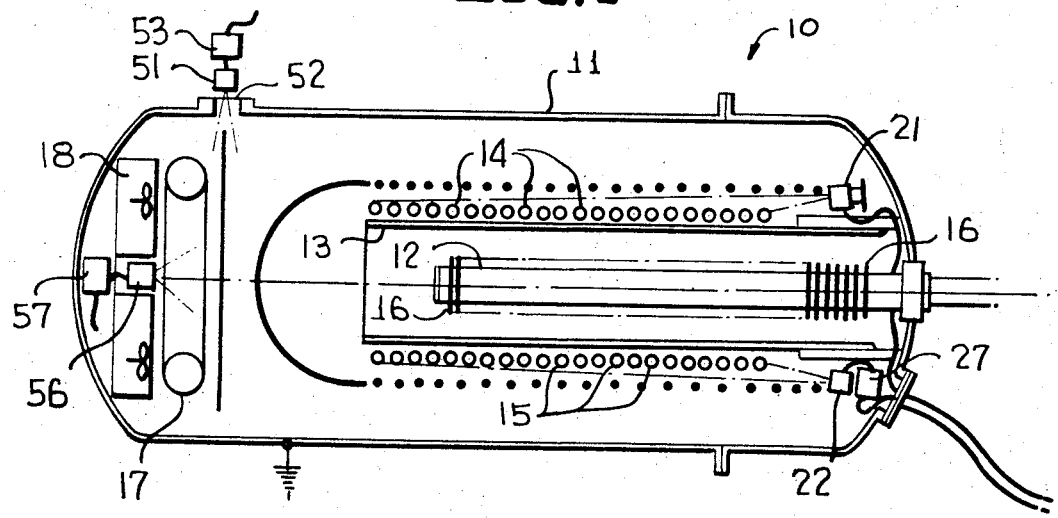
FIG. 1 is a partially diagrammatic side view of a charged particle accelerator in which the optical detector of the present invention is utilized.

Referring specifically to FIG. 1 of the accompanying drawings, a charged particle accelerator 10 is illustrated employing the optical detectors of the present invention. The particular accelerator illustrated is a Dynamitron model manufactured by Radiation Dynamics, Inc. of Westbury, New York. The accelerator includes a generally cylindrical evacuated container or vessel 11 having a beam tube 12 interiorly mounted at one end and extending along the central longitudinal axis of the vessel. Vessel 11 is gas tight and electrically grounded. Beam tube 12, by way of example, may be of the type described in U.S. Pat. No. 3,178,601 to Cleland and is arranged to accelerate electrons or ions axially along its length. A series of resistors (not shown) are connected between adjacent mutually isolated conductive rings 16 to establish a substantially linear potential gradient along the length of beam tube 12.

An insulating member 13 is disposed coaxially about beam tube 12. Two stacks of rectifier tubes 14, 15 are supported along respective opposite sides of member 13, each stack extending longitudinally of vessel 11. The rectifier tubes are connected in series in each stack and serve as part of a voltage multiplication apparatus for beam tube 12 in the manner described in U.S. Pat. No. 2,875,394 to Cleland. Also included as part of the voltage multiplication apparatus is an R.F. transformer 17 which steps up an R.F. voltage signal applied to the unit from a separate source (not shown). The R.F. transformer applies the stepped up R.F. voltage to the rectifier tubes in stack 14 and 15 in the manner described in the aforementioned U.S. Pat. No. 2,875,394. A cooling unit 18 is provided for R.F. transformer 17 which, as shown in FIG. 1, is disposed at one end of vessel 11 with its core disposed about the vessel axis.

Figure 2:
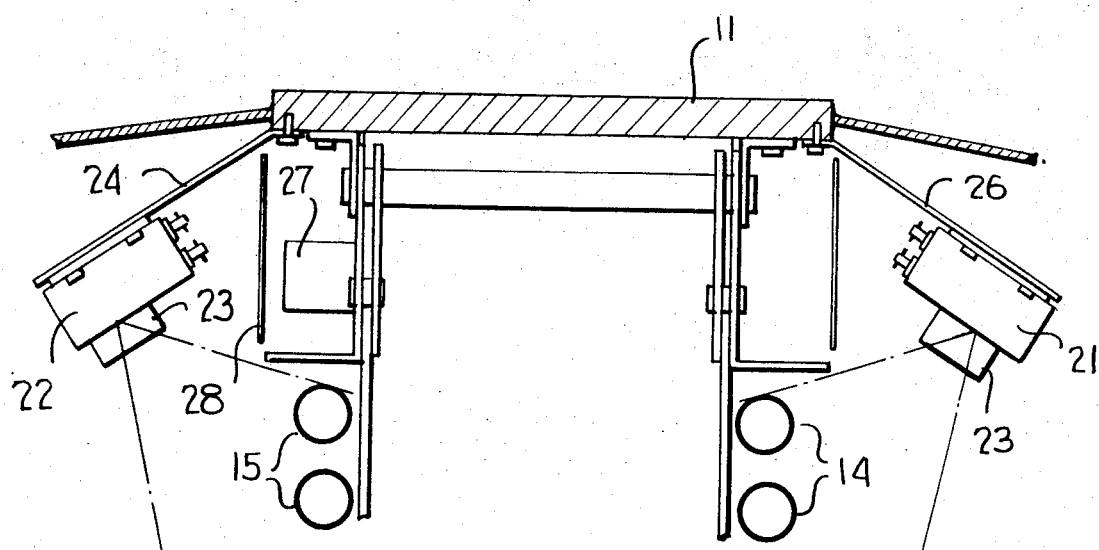
FIG. 2 is a detailed view of a portion of the accelerator of FIG. 1 illustrating the mounting position of a pair of optical detectors utilized to monitor a rectifier tube stack in the accelerator.

A rectifier fault detector according to the present invention includes two optical detector units 21 and 22 mounted on opposite sides of member 13 such that each may view a respective rectifier tube stack 14 and 15. The actual mounting arrangements for detectors 21 and 22, represented only diagrammatically in FIG. 1, are illustrated in detail in FIG. 2. Specifically, the detector includes an elongated light entrance slit (not shown) surrounded by a light shield 23. A mounting bracket 24 is secured at one end to an end wall of vessel 11 and projects divergently away from the vessel axis on the side of member 13 along which rectifier tubes 15 are arranged. Detector 22 is mounted on bracket 24 with its light entrance slit positioned to "view" or receive light emitted from all rectifier tubes in stack 15. A similar mounting bracket 26 is secured at one end to the vessel end wall and projects divergently away from the vessel axis on the side of member 13 along which rectifier tubes 14 are positioned. Detector 21 is mounted on bracket 26 with its light entrance slit positioned to "view" or receive light from all of rectifier tubes 14. Light shields 23 are included for both detectors 21, 22 to minimize the amount of background light entering these detectors, thereby substantially restricting the light entering the detector to that emitted by the rectifier tubes. A common high voltage power supply 27 for both detectors 21 and 22 is mounted within R.F. shield 28 inside vessel 11 at the low voltage end of the rectifier tube stacks 14, 15.

Referring specifically to FIG. 3, the basic components of detectors 21 and 22 are a photo-multiplier tube 31, a blue light optical filter 32, and a series of neon voltage regulating tubes 33, 34, 35, 36 and 37 connected between successive dynodes of the photo-multiplier tube. Photo-multiplier tube 31 is illustrated schematically only so that the number of dynodes and voltage regulating tubes may vary as necessary. All of the aforesaid detector components are mounted inside a lead shielded housing to protect the components from radiation damage.

The high voltage power supply 27 is connected across the series-connected voltage regulating tubes 33–37 with the negative supply terminal connected to the photo-multiplier tube cathode. The latter is positioned to receive light passed by optical filter 32 which passes only light waves in the blue portion of the spectrum and centered at a wavelength of 407 m$\mu$. The photo-multiplier tube anode provides a negative current output signal which is proportional to the intensity of light impinging on the cathode. This output signal is passed to a sensing circuit located outside accelerator vessel 11 and illustrated schematically in FIG. 4.

Referring specifically to FIG. 4, the output signal from photo-multiplier tube 31 in detector 21 is fed to an amplifier 41 which converts the negative current signal to a proportional positive voltage. This amplified signal is in turn applied to the positive input terminal of a differential amplifier 43. The negative current output signal from photo-multiplier tube 31 in detector 22 is similarly converted to an amplified proportional positive voltage by amplifier 42. This amplified voltage signal is applied to the negative input terminal of differential amplifier 43. In order to eliminate activation of the detector by momentary discharges, differential amplifier 43 includes a low pass filter having a corner frequency at approximately 40 Hz.

The output signal from differential amplifier 43 is fed to a full wave bridge rectifier 44 and then amplified by amplifier 45. The latter in turn is fed to a relaxation oscillator 46, for example of the unijunction transistor type, which is triggered on when the output signal from amplifier 45 is above some predetermined threshold voltage. Output pulses from oscillator 46 trigger silicon control rectifier (SCR) 47 on to actuate appropriate relay and control circuits 49. The latter may simply provide a relay deactuation to deactuate the accelerator High Voltage Power Supply 50, thereby removing high voltage from the accelerator. A conventional reset control 48 is provided to turn off SCR 47.

In operation, the circuit of FIG. 4 is adjusted by first turning the accelerator on and increasing the accelerator high voltage to approximately 33% of its full rated value. At this point all of the rectifier tubes in stacks 14, 15 emit a relatively high level of orange light plus a small component of blue light. The blue component is passed by filter 32 in both detectors 21, 22 to produce relatively small output currents from the photo-multiplier tubes in these detectors. These currents are converted to positive voltages and amplified by amplifiers 41 and 42. These voltages are then applied to differential amplifier 43 which is adjusted to provide a zero voltage output signal with all of the rectifier tubes lighted as described.

When the accelerator is operating at normal voltage and a rectifier tube fault occurs, a high level of the light is emitted and detected by the appropriate detector 21 or 22. If, for example, a rectifier tube in stack 14 emits a blue glow, the output signal from detector 21 increases in amplitude and drives the output signal from differential amplifier 43 positive. If a tube in stack 15 glows blue the output signal from differential amplifier is driven negative. In either case, the polarity difference is eliminated by rectifier 44 which provides only a positive output signal. This signal actuates oscillator 46 and in turn SCR 47 to remove high voltage from the accelerator.

Referring again to FIG. 1, accelerator 10 is also provided with an arc detector arranged to detect arcs in the vicinity of RF transformer 17. For the accelerator illustrated in FIG. 1, arc detector 51 can be mounted in at least two possible positions. One such position is outside vessel 11, wherein arc detector 51 is positioned to view the vessel interior through a transparent viewing port 52. Detector 51 is identical to detectors 21 and 22 in all respects except for the absence of viewing shield 22. The absence of such shield permits detector 51 to have a wide field of view in detecting electrical discharges inside vessel 11. The viewing axis is perpendicular to the longitudinal axis of the vessel and extends across the vessel between RF transformer 17 and beam tube 12. A high voltage power supply 53, identical to supply 27 for detectors 21 and 22, is provided for detector 51.

Viewing port 52 is in the form of a slit of the same configuration as the viewing slit in the detector. By this expedient outside light is prevented from entering the vessel. The inside of the vessel is painted with a high gloss enamel white paint to render the interior walls reflective. Detector 51 may therefore sense either direct or reflected light from high voltage discharges in the vessel.

An alternative position for the arc detector would be inside vessel 11 as indicated by detector 56 in FIG. 1. Detector 56 is provided with a high voltage power supply 57 and is identical to detector 51 in all respects except that it is mounted centrally of cooler unit 18 and is arranged to view along the longitudinal axis of the vessel through the aperture in the core of RF transformer 17. For this mounting position, of course, no viewing port is required through the vessel. Other mounting positions for the arc detector are possible, and in fact are necessary if the position of RF transformer 17 is changed. Importantly, the arc detector must be positioned to sense, directly or indirectly, the light produced during high voltage discharges in the proximity of the RF transformer.

Referring specifically to FIG. 5 arc detector 51 operates in a manner similar to detectors 21, 22. Upon the occurrence of an arc at or proximate RF transformer 17, the characteristic blue emitted light produces a negative current output signal from the photomultiplier tube 31 in arc detector 51 (or 56). This current is converted to a positive voltage and amplified by amplifier 61. This signal is passed through a low pass filter 62 to reduce high frequency noise and is amplified again by amplifier 63. The signal is then fed through a diode 64 to oscillator 65 which is substantially the same type as oscillator 46 of FIG. 4. Diode 64 serves to prevent the charging capacitor in relaxation oscillator 65 from discharging rapidly as it otherwise might because of the relatively low frequency of the light pulses produced by detected arcs. When oscillator 65 is actuated it renders SCR 66 conductive to thereby actuate a further unijunction transistor relaxation oscillator 67. The latter triggers a further SCR 68 into conduction to thereby actuate an automatic regulator circuit 69. The latter causes the RF oscillator which drives transformer 17 to be clamped, reducing oscillation to a minimum. This immediately reduces the power available in the arc inside the vessel so that the arc is extinguished and damage to the protective spark gaps for the transformer is prevented.

When SCR 66 is actuated it also actuates a relay and control circuit 70 to shut down the high voltage applied to the accelerator. This may be a simple relay contact opening which removes primary power from the accelerator high voltage supply.

Control circuitry 49 and 70 (FIGS. 4 and 5, respectively) include indicators to permit an operator to distinguish between rectifier tube failures and momentary discharges or arcs in the high voltage generator. That is, a rectifier tube failure indicator is actuated by circuit 49, whereas a high voltage arc indicator is actuated by circuit 70.

Additional features, such as test circuits for detecting the operability of arc detector 51 and rectifier tube failure detectors 21 and 22 may be included.

While I have described and illustrated one specific embodiment of my invention, it will be clear that variations of the details of construction which are specifically illustrated and described may be resorted to without departing from the true spirit and scope of the invention as defined in the appended claims.

I claim:

1. In a charged particle accelerator of the type employing rectifier tubes in a voltage multiplication circuit, said rectifier tubes possessing the characteristic of emitting a blue glow upon failure, a combination comprising:

a photosensitive element of the type which provides an output signal which varies as a function of the intensity of light impinging upon said element, said element being positioned to receive light emitted by said rectifier tubes;

an optical filter for passing only blue light and positioned to filter light received by said photosensitive element; and means responsive to a rectifier tube failure, as manifested by a predetermined change in output signal from said photosensitive element, for shutting down said accelerator.

2. In the accelerator according to claim 1 wherein high voltage components in said accelerator are subject to arcing with accompanying emission of blue light, said combination further comprising:

a further photosensitive element of the type which provides an output signal which varies as a function of the intensity of light impinging upon said further element, said further element being positioned to receive light emitted during arcing at said high voltage components;

a further optical filter for passing only blue light and positioned to filter light received by said further photosensitive element; and further means responsive to a high voltage arc in said accelerator, as manifested by a predetermined change in the output signal from said further photosensitive element, for shutting down said accelerator.

3. The accelerator according to claim 2 wherein one of said high voltage components is an RF transformer, and wherein said further photosensitive element is positioned to receive light emitted in the immediate vicinity of said RF transformer.

4. The accelerator according to claim 2 wherein said accelerator is housed in an enclosure, the inside walls of which are coated with a highly reflective material.

5. In a system wherein high voltage components are subject to arcing with accompanying emission of blue light, a combination comprising:

a photosensitive element of the type which provides an output signal which varies as a function of the intensity of light impinging upon said further element, said element being positioned to receive light emitted during arcing at said high voltage components;

an optical filter for passing only blue light and positioned to filter light received by said photosensitive element; and means responsive to a high voltage arc in said system, as manifested by a predetermined change in the output signal from said photosensitive element, for removing high voltage from said system.

6. A charged particle accelerator of the type wherein a plurality of rectifier tubes are provided as part of a voltage multiplication circuit, said rectifier tubes being of the type which emit a characteristic blue light upon failure and being positioned in first and second physically remote groups, said accelerator further comprising:

a first optical detector positioned to receive light emitted by said first group of rectifier tubes, said first optical detector including: photosensitive means responsive to light impinging thereupon for providing an electrical output signal having an amplitude proportional to the intensity of the impinging light; and an optical filter for passing only said characteristic blue light; said filter being positioned to filter all light received by said first optical detector before that light impinges upon said photosensitive means;

a second optical detector positioned to receive light emitted by said second group of rectifier tubes, said second optical detector including: photosensitive means responsive to light impinging thereupon for providing an electrical output signal having an amplitude proportional to the intensity of the impinging light; and an optical filter for passing only said characteristic blue light, said filter being positioned to filter all light received by said second optical detector before that light impinges upon said photosensitive means;

combining means for combining the output signals from said photosensitive means in said first and second optical detectors and providing a control signal having a quiescent amplitude when neither group of rectifier tubes experiences a failure and having an operative amplitude when a failure occurs in at least one of said rectifier tubes; and means responsive to the operative amplitude of said control signal for shutting down said accelerator.

7. The accelerator according to claim 6 wherein said first and second groups of rectifier tubes are arranged in longitudinally extending parallel stacks.

8. The accelerator according to claim 6 wherein said combining means includes a differential amplifier arranged to provide said control signal at an amplitude which is proportional to the difference in amplitude between the output signals from the photosensitive means at said first and second optical detectors.

9. The accelerator according to claim 8 further comprising rectifier means for rendering said control signal unipolar.

10. The accelerator according to claim 8 wherein said photosensitive means at said first and second optical detectors comprises a photo-multiplier tube.

11. The accelerator according to claim 6 including a plurality of high voltage components subject to arcing with accompanying emission of said characteristic blue light, said accelerator further comprising:

a photosensitive element of the type which provides an output signal which varies as a function of the intensity of light impinging upon said elements, said element being positioned to receive light emitted by said high voltage components;

an optical filter for passing only blue light and positioned to filter light received by said photosensitive element; and means responsive to an arc at said high voltage components, as manifested by a predetermined change in output signal from said photosensitive element, for shutting down said accelerator.

12. The method of protecting a high voltage system against damage occurring as a result of arcing at high voltage components, said arcing being accompanied by a characteristic blue light, said method comprising the steps of:

sensing the emission of said characteristic blue light from said high voltage components;

generating an electrical signal whenever said characteristic blue light is sensed; and shutting down said system upon generation of said electrical signal.

13. The method of protecting a high voltage system against damage occurring as a result of rectifier tube failure wherein said rectifier tube failure is manifested by the emission of a characteristic blue light, said method comprising the steps of:

sensing the emission of said characteristic blue light from said rectifier tube;

generating an electrical signal whenever said characteristic blue light is sensed; and shutting down said system upon generation of said electrical signal.

14. The method according to claim 13 for additionally protecting said system against damage occurring as a result of arcing at high voltage components, said method including the additional steps of:

sensing the emission of said characteristic blue light from said high voltage components;

generating a further electrical signal whenever said characteristic blue light from said components is sensed; and shutting down said system upon generation of said further electrical signal.

* * * * *